US006940796B2

United States Patent
Ariyama (10) Patent No.: US 6,940,796 B2
(45) Date of Patent: Sep. 6, 2005

(54) OPTICAL DISK DEVICE USING A NEW ALTERNATE LIST FOR DEFECT CORRECTION

(75) Inventor: Takeo Ariyama, Kawasaki (JP)

(73) Assignee: NEC Electronics Corporation (JP)

(*) Notice: Subject to any disclaimer, the term of this patent is extended or adjusted under 35 U.S.C. 154(b) by 391 days.

(21) Appl. No.: 10/186,586

(22) Filed: Jul. 1, 2002

(65) Prior Publication Data

US 2003/0002412 A1 Jan. 2, 2003

(30) Foreign Application Priority Data

Jul. 2, 2001 (JP) ........................................ 2001/201023

(51) Int. Cl.[7] ................................................ G11B 7/00
(52) U.S. Cl. ................................ 369/53.17; 369/47.14; 714/8
(58) Field of Search .......................... 369/53.17, 53.16, 369/53.15, 47.14; 714/8, 6, 100

(56) References Cited

U.S. PATENT DOCUMENTS 4,841,498 A * 6/1989 Sugimura et al. ........ 369/53.15
5,732,050 A * 3/1998 Horie ....................... 369/47.14
6,205,099 B1 * 3/2001 Sasaki et al. ............. 369/53.17

FOREIGN PATENT DOCUMENTS

| JP | 1-245463 | 9/1989 |
| JP | 03-207053 | 9/1991 |
| JP | 6-325494 | 11/1994 |
| JP | 8-180598 | 7/1996 |
| JP | 10-275425 | 10/1998 |
| JP | 2000-21090 | 1/2000 |
| JP | 2000-298949 | 10/2000 |

* cited by examiner

Primary Examiner—Hoa T. Nguyen
Assistant Examiner—Peter Vincent Agustin
(74) Attorney, Agent, or Firm—Hayes Soloway P.C.

(57) ABSTRACT

The optical disk device according to the present invention has a data reader which reads data of an optical disk, the disk being provided in advance with an alternate area that serves as a substitute for a defective data area when there is a defect in a data area. The disk is recorded in advance with list information consisting of a plurality of sets each of the sets comprising a position on the disk for the data area and an address of the alternate area. The optical disk also includes buffers for buffering a data area that is defective after correcting it, and a storage device for storing a new alternate list on which is recorded the correspondence relationship between the alternate area and its buffer destination.

2 Claims, 6 Drawing Sheets

OPTICAL DISK DEVICE USING A NEW ALTERNATE LIST FOR DEFECT CORRECTION

BACKGROUND OF THE INVENTION

1. Field of the Invention

The present invention relates to an optical disk device, and more particularly to a device for reading data from a rewritable optical disk.

2. Description of the Prior Art

Figure 4:
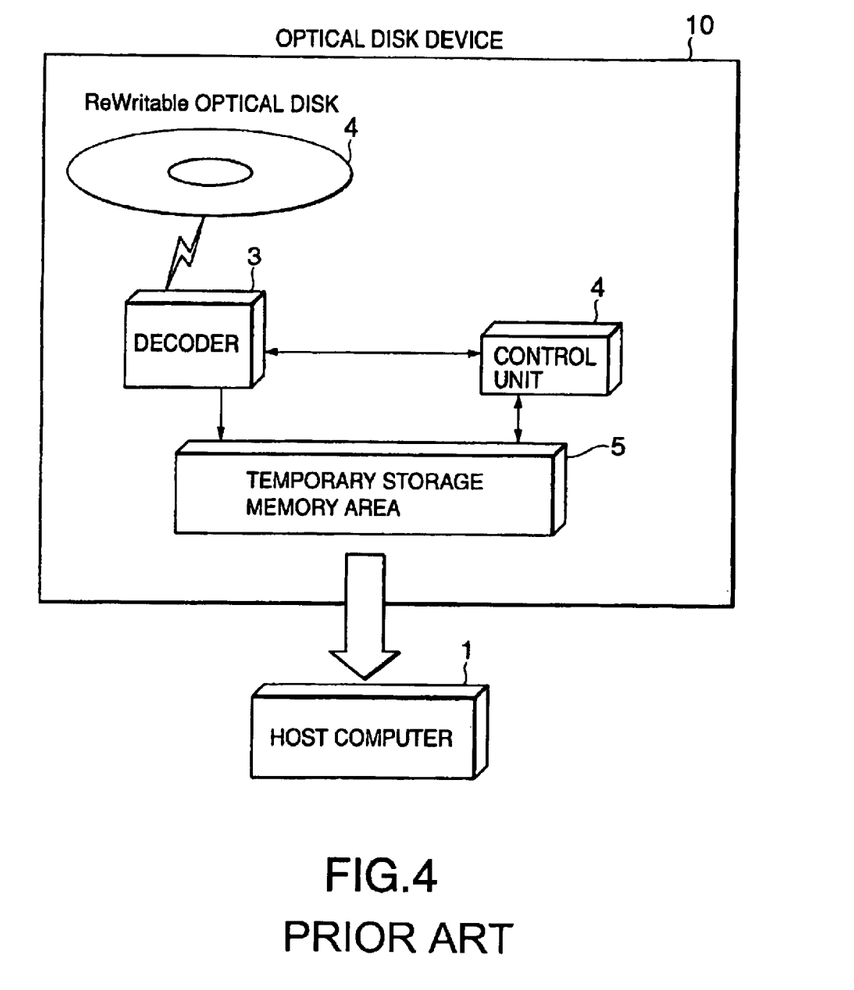
FIG. 4 is a diagram showing the system configuration of the embodiments of this invention and of the prior art.
Figure 5:
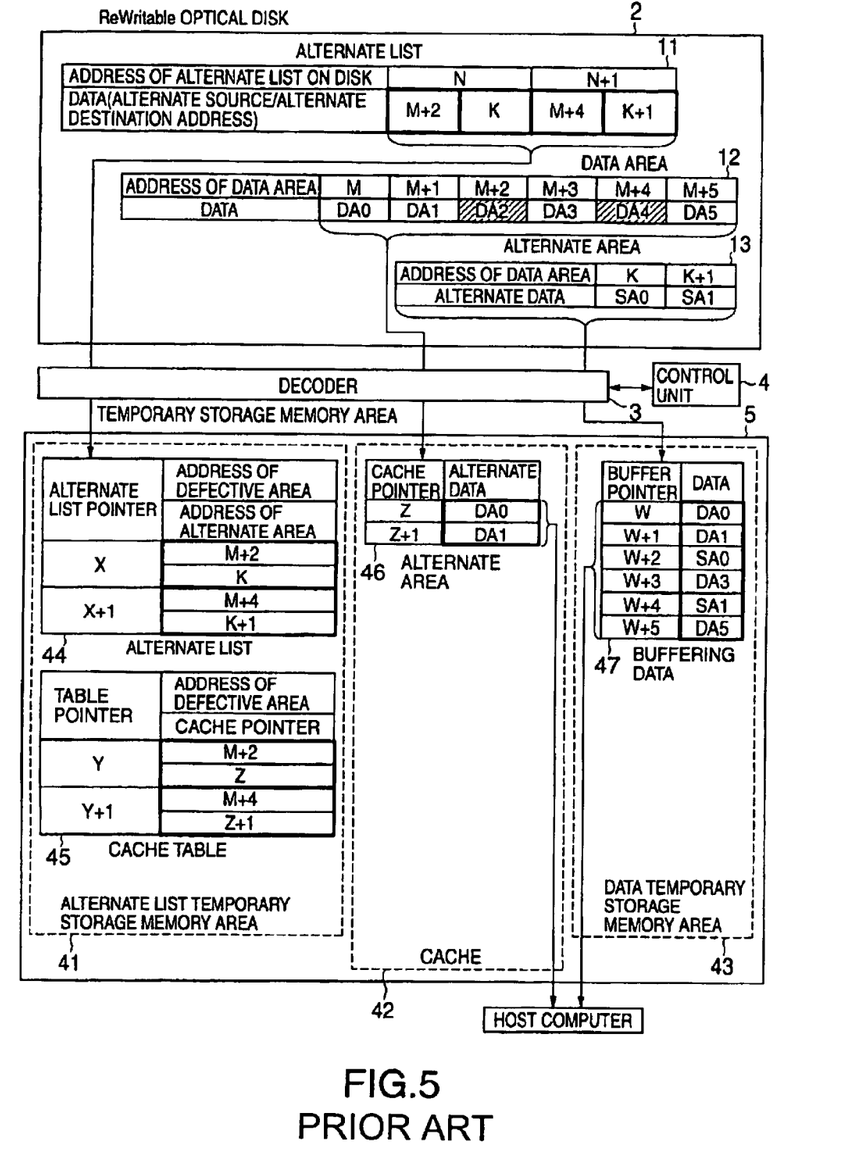
FIG. 5 is a block configurational diagram of the conventional optical disk and optical disk device.

The conventional optical disk device and data management method will be described by reference to FIG. 4 and FIG. 5. FIG. 4 is a diagram showing the conventional system configuration, and FIG. 5 is a diagram showing the configuration of conventional optical disk and optical disk device. As shown in FIG. 4 and FIG. 5, the conventional technology includes an optical disk device 10 which acquires data of a rewritable optical disk and stores it temporarily (this process will be referred to as buffering and also as buffer for short) and a host computer 1 which is the eventual transfer destination of the buffered data In the discussion that follows, a pointer within a cache of a cached alternate area will be represented as a cache pointer. Moreover, a list consisting of a plurality of sets each of which being formed of an address in a defective area and a cache pointer will be represented as a cache table 45, and a pointer showing the position in a temporary storage memory area 41 of an alternate list for the cache table 45 will be represented as a table pointer.

The optical disk device 10 is composed of a rewritable optical disk (represented as ReWritable optical disk in the drawings) 2 having an alternate list 11, a data area 12 and an alternate area 13, a decoder 3 for acquiring data from the optical disk 2, a temporary storage memory area 5, and a control unit 4 for controlling data acquisition, construction of a cache table and transfer of data to the host computer 1.

The decoder 3 acquires an alternate list 44 from the optical disk 2 for the alternate list temporary storage memory area 41, executes buffering for the data area 12, and executes caching for a data in the alternate area 13.

The temporary storage memory area 5 is subdivided into an alternate list temporary storage memory area 41 for buffering the alternate list 11, a data temporary storage memory area 43 for buffering data, and a cache 42 for caching a data in the alternate area.

Figure 6:
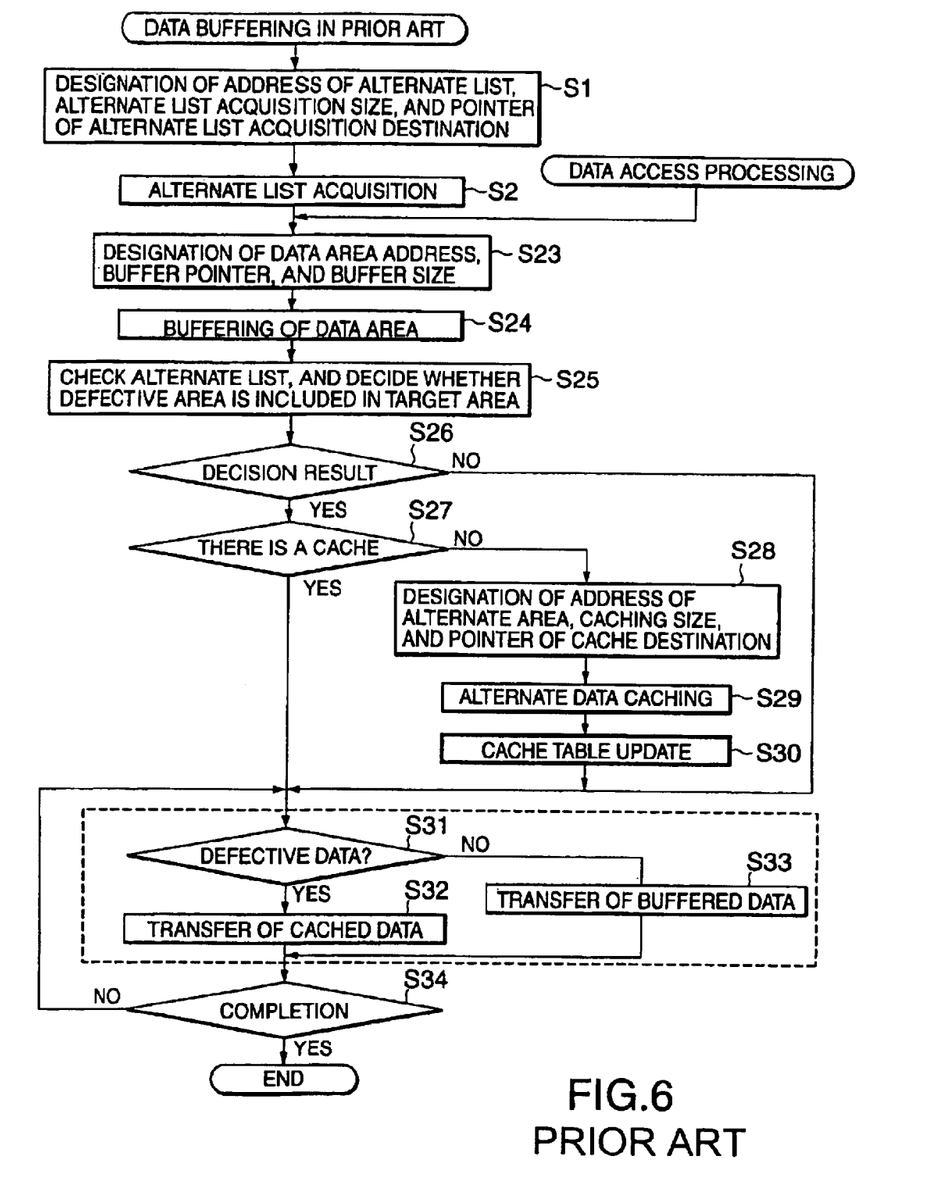
FIG. 6 is a flow chart showing the conventional data buffer flow.

The operation of the prior art will be described by reference to FIG. 5 and FIG. 6. FIG. 6 is a flowchart showing data buffering flow according to the conventional technology.

1. Acquisition of the Alternate List (S1 and S2)

The control unit 4 designates an address of the alternate list 11, an acquisition destination pointer of the alternate list, and the acquisition size of the alternate list to the decoder 3 (S1), and the decoder 3 acquires, for the alternate list acquisition destination pointer of the alternate list temporary storage memory area 41, an alternate list 11 from the address of the designated alternate list 11 of the optical disk 2 for the portion corresponding to the alternate list acquisition size (S2).

2. Buffering of the Data Area 12 (S23 and S24).

The control unit 4 designates the address of the data area 12, the buffer pointer and the buffer size to the decoder 3 (S23), and the decoder 3 executes buffering to the buffer pointer for the portion corresponding to the buffer size, from the address of the designated data area 12 of the optical disk (S24).

3. Caching of Data in the Alternate Area 13 (S25 to S30)

The control unit 4 retrieves within the alternate list 11 to check whether or not there exists a defective data in the buffering data (S25). If no defective data exists, caching of data in the alternative area 13 will not take place (S26) If there exists one, it is checked whether or not the alternate area 13 required for caching has already been cached (S27), and only when it is not cached yet, the control unit 4 designate the address, the caching size and the cache pointer of the alternate area 13 to the decoder 3 (28), and the decoder 3 caches, to the cache pointer, data of the alternate area 13 for the portion corresponding to the cache size from the addresses of the alternate area 13 (S29).

Moreover, with an address of a defective area and a buffer pointer where the data of the defective area is buffered are formed into one set, a cache table 45 is constructed from a collection of such sets equal in number to the number of buffer pointers present in the area of the temporary storage memory area 5 (S30).

4. Transfer of Buffered Data and Cached Data to the Host Computer (S31 to S34)

The control unit 4 checks whether or not the buffered data indicated by the buffer pointer is a defective data by referring to the caching table constructed in process 3 in the above (S31). If it is not defective, data is transferred from the temporary storage memory area 5 to the host computer 1 (S33), and if it is a defective data, an alternate data for the defective data is transferred to the host computer 1 from the cache (S32). The above processing is repeated for number of times corresponding to the buffer size (S34).

As seen from the above processing, when a defective data is found in the data buffered from a rewritable optical disk, it is necessary to cache alternate area data to serve as the substitute. Prior art for caching an alternate area can be found in Japanese Patent Applications Laid Open, No. 2000-21090, Japanese Patent Applications Laid Open, No. 2000-298949, Japanese Patent Applications Laid Open No. Hei 6-325494, Japanese Patent Applications Laid Open, No. Hei 8-180598, Japanese Patent Applications Laid Open, No. Hei 1-245463, and the like. However, a cache is needed for implementing caching, which has been a problem in the method.

That is, a rewritable optical disk has an alternate list and an alternate area in the unit of tracks, and access is made in the unit of tracks, so that according to the conventional method, caching algorithm fails to act effectively, and an additional caching time and a cache are needed for implementing caching.

BRIEF SUMMARY OF THE INVENTION

It is the object of the present invention to provide an optical disk device which obviates the necessity for caching an alternate area to be substituted for a defective area, and realizes a temporary storage memory area needed for buffer information before the transfer of data to the host computer.

SUMMARY OF THE INVENTION

The optical disk device according to this invention has a means which reads data of an optical disk, in which an alternate area which serves as a substitute when a defect occurs in the data area is provided in advance, and list information consisting of a plurality of sets each of the set being formed of a position on the disk of the data area and an address of its alternate area is recorded on the disk in advance, and corrects a defective data area and buffers it, and a means which stores anew alternate list on which is recorded the correspondence relationship between the alternate area and its buffer destination. The buffer means after correction comprises a normal data buffer means which refers to the new alternate list and executes buffer of data in a normal data area without executing buffer of data in a defective data area, an alternate data buffer means which refers to the new alternate list and buffers a data in an alternate area in a buffer area shown in the new alternate list, and a final data-buffer means which buffers an alternate data in a data area which is a defect of a buffer data obtained by the normal data buffer means by combining the buffered data obtained by the normal data buffer means and the buffered data obtained by the alternate data buffer means.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Figure 1:
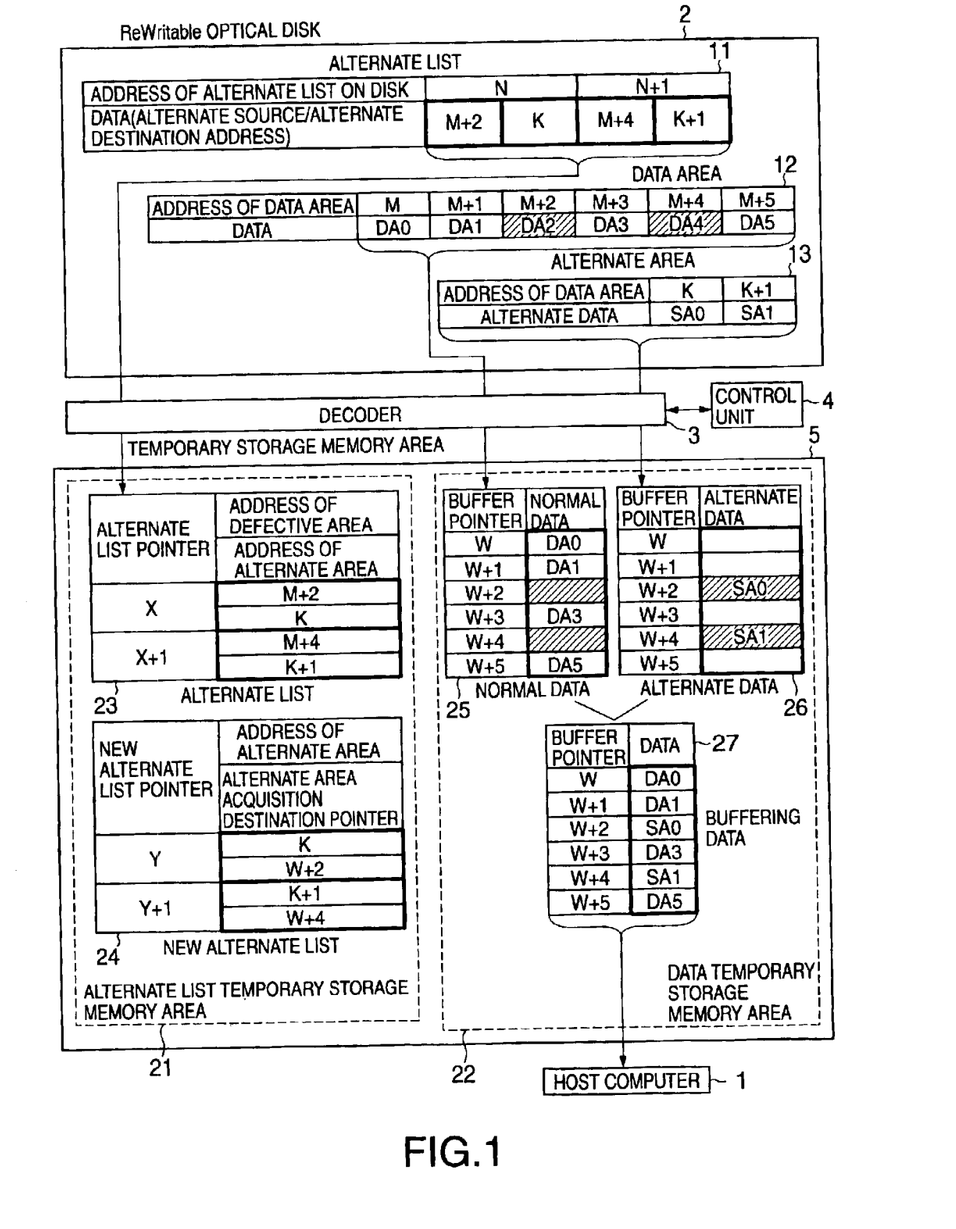
FIG. 1 is a block configurational diagram of an optical disk and an optical disk device according to the embodiments of this invention.

Referring to FIG. 1 and FIG. 4, the optical disk device, program and data management method of the optical disk device according to the embodiments of this invention will be described. FIG. 1 is a block diagram of the optical disk device according to the embodiments of this invention. It should be mentioned that the system configuration of the present embodiments is the same as that of FIG. 4.

The optical disk device 10 according to the present invention is provided in advance with an alternate area 13 which serves as a substitute when the data area 12 has a defect, as shown in FIG. 1 and FIG. 4. The position of the data area 12 on the disk and the address in its alternate area 13 are combined into a set, and an alternate list 11 in the form of an information list consisting of a plurality of such sets is recorded on the optical disk 2 in advance. The device 10 is provided with a data temporary storage memory area 22 in which a data area 12 that was found defective at the data read of the optical disk 2 is buffered after correction. Also it is provided with a new alternate list 24 on which is recorded the correspondence relationship between the alternate area and its buffer destination. The data temporary storage memory area 22 is provided with a normal data buffer section 25 which refers to the new alternate list 24 and buffers normal data in the data area 12, rather than buffer defective data in the data area 12, an alternate data buffer section 26 which refers to the new alternate list 24 and buffers data in the alternate area 13 in the buffer area indicated by the new alternate list 24, and a final data buffer section 27 which buffers an alternate data in a data area which is a defect of the buffered data by the normal data buffer section 25, by combining the buffered data obtained by the normal data buffer section 25 and the buffered data obtained by the alternate buffer section 26.

In the following, the embodiments of this invention will be described in more detail.

As shown in FIG. 1 and FIG. 4, this invention comprises an optical disk device 10 which acquires data of a rewritable optical disk 2 and buffers it, and a host computer 1 which is the final transfer destination of the buffered data.

The optical disk device 10 is constituted by the optical disk 2 which is equipped with the alternate list 11, the data area 12 and the alternate area 13, the decoder 3 for acquiring data from the optical disk 2, the temporary storage memory area 5 for buffering the acquired data or the like, and the control unit 4 which controls data acquisition and its transfer to the host computer 1.

The decoder 3 has a function of acquiring an alternate list 23 from the optical disk 2 to an alternate list temporary storage memory area 21 of the temporary storage memory area 5, a function of referring to the new alternate list 24 which is a list of the alternate area 13 and the buffer destination, buffering only a normal area to the normal buffer section 25 and does not perform buffering of fault area, and a function which refers to the new alternate list 24, and buffers the alternate area 13 to a buffer area indicated in the new alternate list 24 for the alternate data buffer section 26.

The temporary storage memory area 5 is subdivided into the alternate list temporary storage memory area 21 for temporarily storing the alternate list 23, and a data temporary storage memory area 22 for buffering data.

Figure 2:
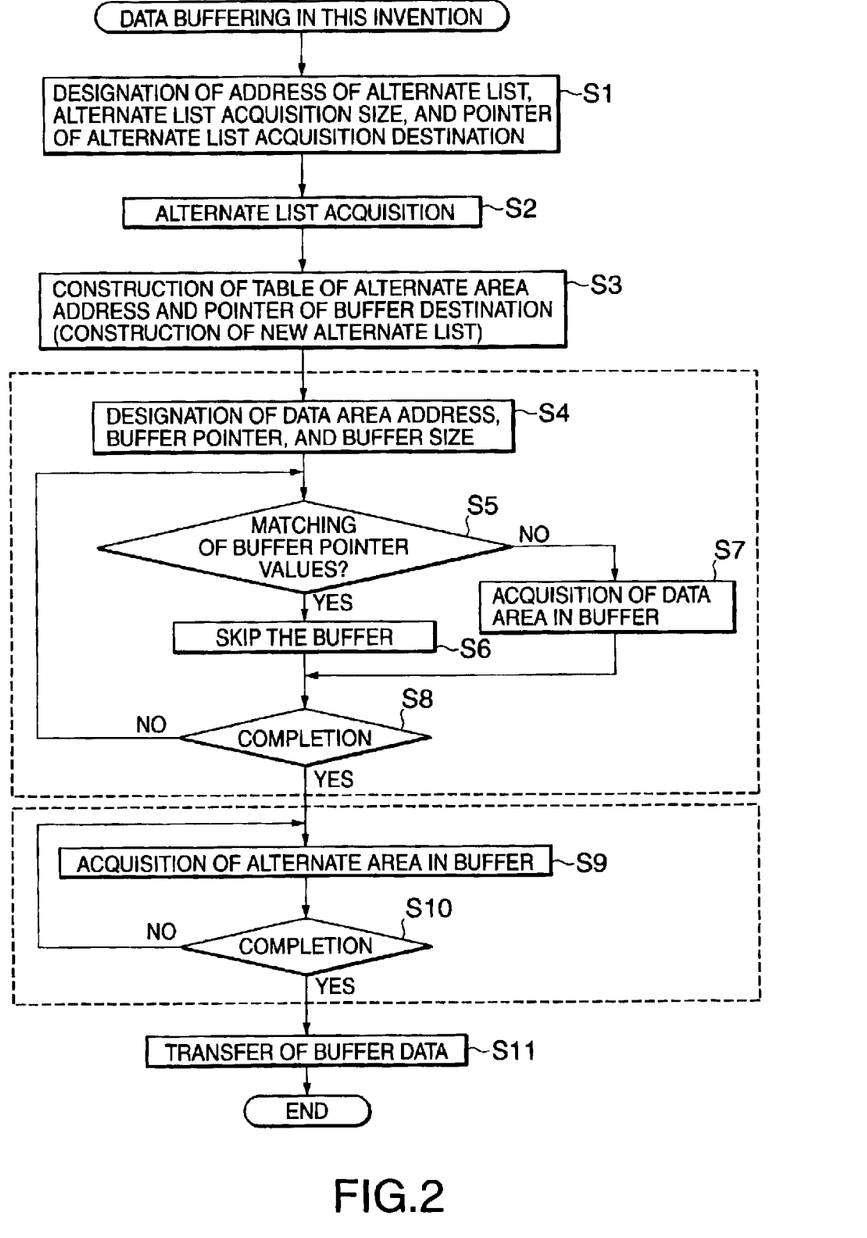
FIG. 2 is a flow chart showing the data buffer flow of a first embodiment of the invention.

Referring to FIG. 1 and FIG. 4, the operation of a first embodiment of the invention will be described. FIG. 2 is a diagram showing the data buffer flow in the first embodiment. The algorithm of the invention will be described according to FIG. 1 and FIG. 2.

The respective pointers showing the positions of the alternate list acquisition destination and the acquired alternate list, in the alternate list temporary store memory area, will be represented as the alternate list acquisition destination pointer and the alternate list pointer, respectively. Besides, assuming that the decoder 3 makes access to the optical disk 2 in the unit of sectors, and that the one-sector data of the optical disk 2 is acquired for one pointer of the temporary store memory area 5, the number of sectors of acquired alternate list 11 will be referred to in the following as the alternate list acquisition size.

1.1 Acquisition of the Alternate List (S1 and S2)

The control unit 4 designates to the decoder 3 the address of the alternate list 11 of the optical disk 2, the alternate list acquisition size, and the alternate list acquisition destination pointer (S1). The decoder 3 acquires the alternate list 11 for the alternate list temporary storage memory area 21 from the addresses of the designated alternate list 11 of the optical disk 2 for the portion corresponding to the alternate list acquisition size, starting with the alternate list acquisition pointer (S2).

1.2 Construction of Table for Address of the Defective Area and Pointer of Buffer Destination of the Alternate Area 13 (S3)

The position in the data temporary storage memory area 22 of the buffer destination of the data area of the optical disk 2 will be represented as the buffer pointer, and the number of sectors to be buffered will be represented as the buffer size. From the alternate list 23, the buffer pointer and the buffer size, the control unit 4 constructs a new alternate list 24 consisting of a plurality of sets each set formed of the address of the alternate area and the pointer of the buffer that buffers its alternate area at the position represented as the new alternate list pointer of the alternate list temporary storage memory area 21.

1.3 Buffering Only of Normal Area in the Data Area 12 (S4 to S8)

The control unit 4 designates to the decoder 3 the address of the data area 12 to be buffered, the buffer pointer and the buffer size (S4), and the decoder 3 compares the pointer of the buffer destination of the alternate list 13 and the buffer pointer while referring to the new alternate list 24 (S5). When they match with each other, buffering is not applied to the buffer pointer, and the buffer destination is updated to the next buffer pointer (S6).

When they do not match, the decoder 3 buffers the data acquired from the optical disk 2 in the buffer pointer and updates the buffer destination to the next buffer pointer (S7). The decoder 3 repeats the above processing for number of times corresponding to the buffer size (S8).

1.4 Buffering of the Alternate Area 13 in the Pointer for the Buffer Destination of the Alternate Area 13 (S9 and S10)

The decoder 3 refers to the new alternate list 24, buffers the data of the address in the alternate area 13 indicated in the new alternate list 24 to the pointer of the buffer destination of the alternate area 13 indicated in the new alternate list 24 (S9). The above processing is repeated until the last member of the new alternate list 24. (S10).

1.5 Transfer of buffered data to the host computer 1 (S11)

The control unit 4 transfers the buffered data obtained by the processings 1.1 to 1.4 to the host computer 1.

The above procedure provides data access which can eliminate unwanted caching.

Next, the operation of the optical disk device 10 of the first embodiment according to the invention will be described using specific numerical values.

2.1 Acquisition of the Alternate List (S1 and S2)

The control unit 4 designates to the decoder 3 a value N for the alternate list 11 of the optical disk 2, a value 2 for the alternate list acquisition size, and a value X for the alternate list acquisition pointer (SI). The decoder 3 stores the alternate list 11 in the area of the alternate list temporary storage memory area 21 with the designated pointer at the head from the address designated by the optical disk 2 (S2).

2.2 Construction of a Table Formed of the Addresses of the Defective Area and Pointers of Buffer Destinations of the Alternate Area 13 (S3)

The control unit 4 constructs, from the alternate list 24, a value W for the buffer pointer, and a value 6 for the buffer size, the new alternate list 24 having the address of the alternate area 13 and the pointer of the buffer which buffers its alternate area 13 as a set, at the position represented by the new alternate list pointer of the alternate list temporary storage memory area 21.

2.3 Buffering Only of Normal Area of the Data Area 12 (S4 to S8)

The control unit 4 designates to the decoder 3 a value M for the address of the data area 12 of the optical disk 2 to be buffered, a value W for the buffer pointer, and a value 6 for the buffer size (S4), and the decoder 3 compares the pointer of the buffer destination of the alternate area 13 indicated in the new alternate list 24 and the buffer pointer (S5). Since there can be found no matching, the decoder 3 buffers the data DA0 acquired from the optical disk 2 in the buffer pointer W and updates the buffer destination to the next buffer pointer W+1 (S7). Since the buffer size 6 is not reached yet, the processing is continued (S8).

Since no matching is found for the buffer pointer W+1 either, the data DA1 shown for the address M+1 of the data area 12 of the optical disk 2 is buffered at the buffer pointer W+1, and updates the buffer destination to the next buffer pointer W+2 (S7). Since the buffer size of 6 is not achieved yet, the processing is continued (S8).

Since the buffer pointer of W+2 matches the pointer of the buffer destination of the alternate area 13 shown by a new alternate list pointer Y of the new alternate list 24, the buffer pointer of W+2 is skipped (S6). Since the buffer size of 6 is not reached yet, the processing is continued (S8).

Since no matching is found for the buffer pointer W+3 among the pointers of the buffer destination of the alternate area 13 shown in the new alternate list 24, a data DA3 shown at the address M+3 of the data area of the optical disk 2 is buffered in the buffer pointer W+3, and the buffer destination is updated to the next buffer pointer W+4 (S7). Since the buffer size 6 is not reached yet, the processing is continued (S8).

Since the buffer pointer of W+4 matches the pointer of the buffer destination of the alternate area 13 shown by a new alternate list pointer Y+1 of the new alternate list 24, the buffer pointer of W+4 is skipped (S6). Since the buffer size of 6 is not reached yet, the processing is continued (S8).

Since no pointer is found among the pointers of the buffer destination of the alternate area 13 shown in the new alternate list 24 that matches the buffer pointer W+5, data DA5 shown by address of M+5 of the data area 12 of the optical disk 2 is buffered at the buffer pointer W+5, and the buffer destination is updated to the next buffer pointer W+6 (S7). Since the buffer size condition of 6 is satisfied, the buffer processing for only the normal areas of the data area 12 is completed (S8).

As a result of the above operation, the buffer pointers (W, W+1, W+3 and W+5) for which matching is found between the buffer pointers shown by the new alternate list 24 and the buffer pointers of the data temporary storage memory area 21 which are buffered by the decoder 3, the normal data of the data area 12 are buffered, and the buffer pointers (w+2 and W+4) for which matching is not found are skipped. Accordingly, the policy of "making reference to the new alternate list 24 of the alternate area 13 and its buffer destination to perform buffering only for the normal area and not perform buffering for the fault area" has been observed.

2.4 Buffering of the Alternate Area 13 to Designated Buffer Area (S9 and S10)

The decoder 3 refers to the new alternate list 24, and buffers the data SA0 of the address K of the alternate area 13 shown by the new alternate list pointer Y in the pointer W+2 of the buffer destination of the alternate area 13 shown by the new alternate list pointer Y (S9). Since the last member of the new alternate list 24 is not reached yet, the new alternate list pointer is updated, and the processing by setting the new alternate list pointer to Y+1 is continued (S10). The data SA1 of address K+1 of the alternate area 13 shown for the new alternate list pointer Y+1 is buffered in the pointer W+4 of the buffer destination of the alternate area 13 shown by the new alternate list pointer Y+1 (S9). Since the last member of the new alternate list 24 is reached, the processing of buffering the alternate area 13 in the designated area is completed (S10).

From what has been described in the above, the data (K and K+1) of the alternate area 13 shown by the new alternate list 24 are buffered in the pointers (W+2 and W+4) of the buffer destination of the alternate area 13 shown by the new alternate list 24. Accordingly, the buffering policy of "making reference to the new alternate list 24 to buffer the alternate area 13 in+ the buffer area shown by the new alternate list 24" has been executed.

2.5 Transfer of Buffering Data to the Host Computer 1 (S11)

The control unit 4 transfers the data (DA0, DA1, SA0, DA3, SA1 and DA5) of the buffer pointers W to W+5 buffered in 2.1 to 2.4 to the host computer 1.

From 2.1 to 2.5, it can be seen that it is possible to realize buffering from the optical disk 2 without the use of caching by the combination of the two buffering policies of "making reference to the alternate area 13 and the new alternate list 24 of its buffer destination to buffer only the normal area, and not to buffer the defective area" and of "making reference to the new alternate list 24 to buffer the alternate area 13 in the buffer area shown by the new alternate list 24."

Figure 3:
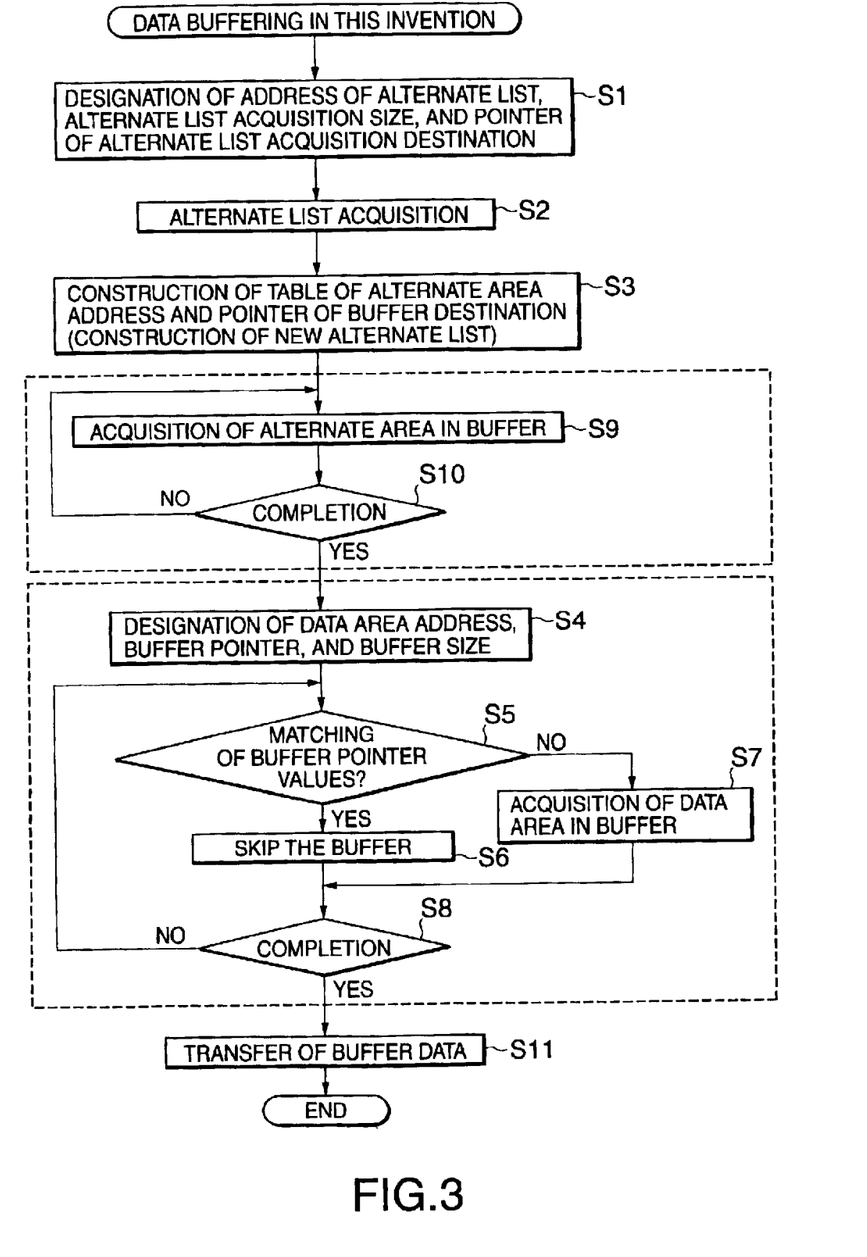
FIG. 3 is a flow chart showing the data buffer flow of a second embodiment of the invention.

Referring to FIG. 1 and FIG. 3, a second embodiment of this invention will be described. FIG. 3 is a flow chart showing the data buffer flow chart of the second embodiment of the invention.

3.1 Acquisition of the Alternate List (S1 and S2)

The operation is the same as in 1.1 of the first embodiment, so it will be omitted.

3.2 Construction of a Table of Addresses of Defective Area and Pointers of Buffer Destination of the Alternate Area 13 (S3)

The operation is the same as in 1.2 of the first embodiment, so it will be omitted.

3.3 Buffering of the Alternate Area 13 in the Pointers of Buffering Destination of the Alternate Area 13 (S9 and S10)

The decoder 3 refers to the new alternate list 24, and buffers address data of the alternate area 13 shown in the new alternate list 24 to the pointers of buffer destination of the alternate area 13 shown in the new alternate list 24 (S9). The above processing is repeated to the last member of the new alternate list 24 (S10).

3.4 Buffering of Only the Normal Area of the Data Area 12 (S4 to S8)

The control unit 4 designates to the decoder 3 the address of the data area 12 to be buffered, the buffer pointer, and the buffer size (S4), and the decoder 3 compares the pointer of the buffer destination of the alternate area 13 and the buffer pointer (S5). When they match, buffering is not performed to the buffer pointer and the buffer destination is updated to the next buffer pointer (S6).

When they do not match, the decoder buffers the data acquired from the optical disk 2 in the buffer pointer, and updates the buffer destination to the next buffer pointer (S7). The decoder repeats the above processing for number of times corresponding to the buffer size. (S8).

3.5 Transfer of the Buffered Data to the Host Computer 1 (S11)

The operation is the same as in 1.5 of the first embodiment, so it will be omitted.

From the processings 3.1 to 3.5, it is possible to realize buffering of data from the optical disk 2 without the use of caching similar to the first embodiment.

As described in the above, according to the present invention, there is no need for caching an alternate area which is substituted for the fault area, and it is possible to realize a temporary storage memory area with smaller capacity for buffering information needed until the transfer of data to the host computer. Moreover, it is possible to reduce the processing time for buffering.

Although the invention has been described with reference to specific embodiments, the description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. An optical disk device comprising:

a data reader for reading data from an optical disk, the optical disk being provided in advance with a data area and an alternate area that serves as a substitute for a defective data area when a defect exists in the data area and the disk being recorded in advance with an information list consisting of a plurality of sets, each of the sets being formed of a position of the data area on the disk and an address of the alternate area;

a buffer for buffering a data area that is defective being read after the data area is corrected; and a storage device for storing a new alternate list on which is recorded the correspondence relationship between said alternate area and a buffer destination of said alternate area, wherein said buffer is equipped with a normal data buffer which refers to said new alternate list and buffers data in a normal data area without buffering data in the defective data area, an alternate data buffer which refers to said new alternate list and buffers data in said alternate area in a buffer destination shown in the new alternate list, and a final data buffer which buffers an alternate data in a data area which is defective of the buffered data obtained by said normal data buffer, by combining the buffered data obtained by said normal data buffer and the buffered data obtained by said alternate data buffer.

2. The optical disk device as claimed in claim 1, wherein said optical disk is a rewritable optical disk equipped respectively with an alternate list containing said information list and said alternate area in a unit of tracks.

* * * * *